United States Patent [19]

Takahashi

[11] Patent Number: 5,682,452
[45] Date of Patent: Oct. 28, 1997

[54] OPTICAL FIBER FERRULE AND OPTICAL COUPLER

[75] Inventor: Mitsuo Takahashi, Matsudo, Japan

[73] Assignee: Seikoh Giken Co., Ltd., Chiba-ken, Japan

[21] Appl. No.: 614,043

[22] Filed: Mar. 12, 1996

[30] Foreign Application Priority Data

Apr. 21, 1995 [JP] Japan .................. 7-120625

[51] Int. Cl.⁶ .................................................. G02B 6/36
[52] U.S. Cl. .................. 385/85; 385/71; 385/72; 385/74; 385/77; 385/78; 385/34; 385/59
[58] Field of Search ............................. 385/71, 72, 74, 385/85, 77, 78, 34, 59

[56] References Cited

U.S. PATENT DOCUMENTS

| | | | |
|---|---|---|---|
| 4,208,094 | 6/1980 | Tomlinson, III et al. | 385/34 X |
| 4,213,677 | 7/1980 | Sugimoto et al. | 385/34 X |
| 4,615,581 | 10/1986 | Morimoto | 385/85 X |
| 4,733,931 | 3/1988 | Pan | 385/34 X |
| 5,082,378 | 1/1992 | Muller et al. | 385/72 |
| 5,216,737 | 6/1993 | Driessen et al. | 385/93 |
| 5,221,839 | 6/1993 | Braun | 385/34 |
| 5,359,683 | 10/1994 | Pan | 385/22 |
| 5,377,286 | 12/1994 | Iida et al. | 385/115 X |
| 5,479,541 | 12/1995 | Pan | 385/22 |
| 5,499,132 | 3/1996 | Tojo et al. | 359/281 |

FOREIGN PATENT DOCUMENTS

| | | | |
|---|---|---|---|
| 0 439 312 | 7/1991 | European Pat. Off. | 385/15 X |
| 60-048004 | 3/1985 | Japan | 385/34 X |
| 2 218 222 | 11/1989 | United Kingdom | 385/15 X |

*Primary Examiner*—Brian Healy
*Attorney, Agent, or Firm*—Spencer & Frank

[57] ABSTRACT

An optical fiber ferrule holding multiple fibers and an optical coupler using the ferrule are provided. An optical fiber ferrule is constructed such that N optical fibers (N equals four or an even number of six or more) are inserted into and fixed in a terminal end hole of the ferrule. The optical coupler comprises first and second optical fiber ferrules as described above, first and second distributed refractive index rod lenses, a mirror coating layer which reflects a portion of and transmits another portion of a light beam incident thereon; and a holding means for bringing the first ferrule and the first distributed refractive index rod lens into close contact, for bringing the second ferrule and the second distributed refractive index rod lens into close contact, for disposing the mirror coating layer between the first and second distributed refractive index rod lenses, and for coaxially holding these components together.

5 Claims, 4 Drawing Sheets

OPTICAL FIBER FERRULE AND OPTICAL COUPLER

BACKGROUND OF THE INVENTION

1. Field of the Invention

The present invention relates to an optical fiber ferrule and an optical coupler using the optical fiber ferrule.

2. Description of the Related Art

Among the known optical couplers are: an optical wave demultiplexer/multiplexer (WDM) in which a multiplexed light beam consisting of two wavelengths passing through a single optical fiber is demultiplexed into two different optical fibers, or different rays of different wavelengths respectively passing through two optical fibers are multiplexed and guided through a single optical fiber; and an optical branching/coupling device for distributing a light beam passing through a single optical fiber into two optical fibers at a desired ratio or, conversely, for combining different rays in two optical fibers into a single optical fiber.

FIG. 10 is a sectional view containing the optical axis of a conventional optical coupler using a distributed refractive index rod lens. This optical coupler is a 1×2 circuit optical wave demultiplexer/multiplexer.

Distributed refractive index rod lenses 1 and 2 constitute a convergent lens unit having an axial length $Z_1=Z_2=0.25$ pitch. It should be noted that one end surface 3 and 4 of each distributed refractive index rod lenses 1 and 2 is polished to have a surface incline of 8° to 12° with respect to a plane perpendicular to the optical axis of the distributed refractive index rod lenses 1 and 2, thereby reducing the optical losses due to reflection. A mirror coating 6 having a desired reflecting and transmitting rate is applied onto the surface of a glass plate 5. The glass plate 5 is bonded to be fixed between end surfaces 7 and 8 of the respective distributed refractive index rod lenses 1 and 2.

Through holes 10 and 11 are provided in the center portion of a ferrule 9 and optical fibers A and B are inserted into and adhered to the through holes 10 and 11 to form a 2-core ferrule.

A through hole 13 is provided at the center of a ferrule 12 and an optical fiber C is inserted and adhered thereto to form a single core ferrule.

Also, terminal end surfaces 14 and 15 of the 2-core ferrule 9 and single core ferrule 12 are similarly polished to have a surface incline of 8° to 12° with respect to a plane perpendicular to the optical axis.

FIGS. 11a, 11b, and 11c show cross sections vertical to the optical axis of the respective portions of the above described coupler.

Here, it is supposed that the distance between optical axes $O_1$ and $O_2$ of the optical fibers A and B attached to the 2-core ferrule 9 is 2r, the optical axis of the optical fiber C of the single core ferrule 12 is $O_3$ and the optical axis of the distributed refractive index rod lenses 1 and 2 is O.

The position of the optical axes $O_1$ and $O_2$ of the optical fibers A and B attached to the 2-core ferrule 9 is fixed so that their respective distance from the optical axis O of the distributed refractive index rod lenses 1 and 2 is r, and the optical axis $O_3$ of the optical fiber C of the single core ferrule 12 is fixed so that its distance from the optical axis O of distributed refractive index rod lenses 1 and 2 is r. It should be noted that fixing by adhesion to the inclined end surface 3 of the distributed refractive index rod lens 1 must be done with precision so as to achieve an accurate correspondence on a normal line YY' which passes through the center of the optical axes $O_1$ and $O_2$ of the optical fibers A and B attached to the 2-core ferrule 9.

When the mirror coating 6 transmits a wavelength $\lambda_1$ and reflects a wavelength $\lambda_2$, an incidence of a light beam containing wavelength components $\lambda_1$ and $\lambda_2$ from the optical fiber A results in the wavelength component $\lambda_1$ being branched to the optical fiber C as transmitted through the mirror coating 6 and the wavelength component $\lambda_2$ being branched to the optical fiber B as reflected by the mirror coating 6. Conversely, by reversing the direction of the light beams, a ray of wavelength $\lambda_2$ in the optical fiber B and a ray of wavelength $\lambda_1$ in the optical fiber C may be multiplexed into the optical fiber A. In other words, it is possible to construct a 1×2 circuit optical wave demultiplexer/multiplexer.

The optical axis $O_3$ of the optical fiber C of the single core ferrule 12 must be secured accurately through a rotational adjustment such that its distance from the optical axis O of the distributed refractive index rod lens 2 is r and that it accurately coincides with a point on the normal line YY' passing through the center of the optical axes $O_1$ and $O_2$ of the optical fibers A and B which are attached to the 2-core ferrule 9.

The excessive losses in an optical coupler of the above described type are greatly affected by the accuracy of the connection of the optical fibers A, B and C to the distributed refractive index rod lenses 1 and 2. An alignment must be performed such that the positioning error in the respective bonded radius r of the optical fibers A, B and C from the optical axis O of the distributed refractive index rod lenses 1 and 2 is 2 μm or less.

Further to adjust the optical axes of the optical fibers A, B and C with respect to the center optical axis O of the distributed refractive index rod lenses 1 and 2, it is also possible to consider a method of automatically adjusting the optical axes based in the outer diametrical surface of the respective components as the reference by making the outer diameter of the 2-core ferrule 9 the same as the outer diameter of the distributed refractive index rod lenses 1 and 2 and aligning them along a V-shaped groove (not shown). It is, however, a prerequisite to regulate the decentering of the two through holes 10 and 11 provided in the 2-core ferrule 9 with respect to the outer diameter thereof to within 1 μm or less. This is very difficult to achieve using the current processing technologies.

One of the reasons for this is that, while it is necessary to hold the two sides of one center hole at the center of a machine to define a processing reference for the outer diametrical polishing in order to remove the eccentricity of a through hole with respect to the outer diameter of the ferrule, no means can be provided for setting such reference plane for the outer diametrical processing when two holes exist in the center portion.

Furthermore, the single core ferrule 12 is aligned to a position eccentric by radius r from the optical axis O of the distributed refractive index rod lens 2 after the aligned assembly of the 2-core ferrule 9 and the distributed refractive index rod lens 1, and must be subjected to an angular rotational adjustment to achieve a coincidence with the optical axis of the optical fiber of the 2-core ferrule 9. The processing becomes complicated and requires skill, many man-hours and much manufacturing cost.

SUMMARY OF THE INVENTION

It is the first object of the present invention to provide an optical fiber ferrule which may be easily manufactured and be used in an optical coupler of the type described above.

It is another object of the present invention to provide an optical coupler for which an adjustment in the assembling process is very easy.

It is a further object of the present invention to provide an optical coupler for which an adjustment in the assembling process is very easy and which may accommodate a large number of optical circuits.

To achieve the above objects, an optical fiber ferrule according to the present invention is constructed such that optical fibers are inserted into and fixed in a hole at a terminal end of the ferrule so as to expose the respective ends of four uncovered optical fibers closely adjoining one another. The terminal end is polished into a surface slightly inclined by an angle θ with respect to a plane perpendicular to the axis of the ferrule.

In the above described optical fiber ferrule, the following relation holds between the inner diameter of the ferrule and the outer diameter of the uncovered optical fiber and the angle of inclination θ may be set to 8° to 12°:

$$d=(2^{1/2}+1)d_1+\delta$$

where d is the inner diameter of the ferrule, $d_1$ is the outer diameter of each uncovered optical fiber and δ represents an error.

An optical coupler according to the first embodiment of the present invention comprises:

first and second optical fiber ferrules each having optical fibers inserted into and fixed in a hole at a terminal end of the ferrule so as to cause the respective ends of four uncovered optical fibers closely adjoining one another to be exposed, the terminal end being polished into a surface slightly inclined by an angle θ with respect to a plane perpendicular to the axis of the ferrule;

first and second distributed refractive index rod lenses each having one end surface polished to have an inclination θ with respect to the optical axis thereof;

a mirror coating layer reflecting a portion of and transmitting another portion of a light beam incident thereon; and a holding means for bringing the respective inclined surfaces of the first ferrule and the first distributed refractive index rod lens into close contact with each other, bringing the respective inclined surfaces of the second ferrule and the second distributed refractive index rod lens into close contact with each other, disposing the mirror coating layer between the first and second distributed refractive index rod lenses, and coaxially holding these components.

In the above described optical coupler, the outer diameter of the ferrules and the outer diameters of the distributed refractive index rod lenses may be substantially the same so that the holding means is provided as a circular cylinder having a corresponding inner diameter.

A ferrule according to a second embodiment of the present invention is an optical fiber ferrule in which N (an even number of 6 or larger) uncovered optical fibers are fixed in close contact to the inner circumference at a terminal end of the ferrule by inserting an auxiliary rod into the center thereof so as to position the optical fiber cores in a concentric circle. The following relation holds among the ferrule terminal end inner diameter, the diameter of each uncovered optical fiber and the outer diameter of the auxiliary rod:

$$d_N=d_1[(1/sin\pi/N)+1]+\delta$$

$$d_O=d_1[(1/sin\pi/N)-1]$$

where $d_N$ is the inner diameter of the ferrule, $d_1$ is the diameter of each uncovered optical fiber, $d_O$ is the outer diameter of the auxiliary rod; and δ represents an error.

An optical coupler according to the second embodiment of the present invention comprises:

the above described first and second optical fiber ferrules;

first and second distributed refractive index optical lenses;

a mirror coating layer reflecting a portion of and transmitting another portion of a light beam incident thereon; and a holding means for bringing the first ferrule and the first distributed refractive index rod lens into close contact with each other, bringing the second ferrule and the second distributed refractive index rod lens into close contact with each other, disposing the mirror coating layer between the first and second distributed refractive index rod lenses, and coaxially holding these components.

DESCRIPTION OF THE PREFERRED EMBODIMENTS

The present invention will now be described in more detail with reference to the drawings.

Figure 1:
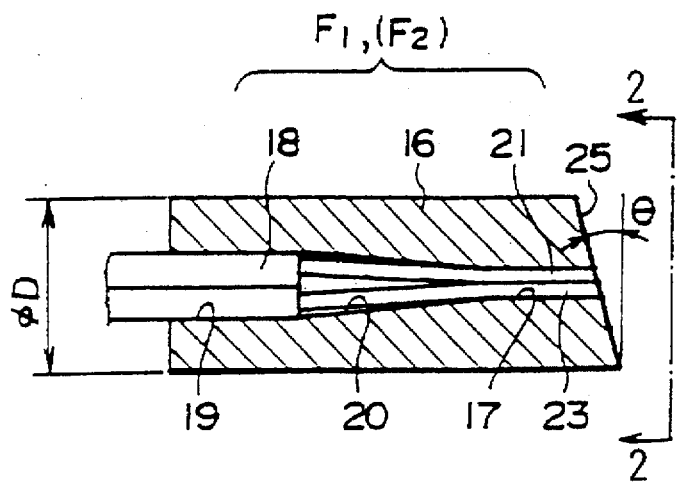
FIG. 1 is a sectional view of the first embodiment of the optical fiber ferrule according to the present invention.
Figure 2:
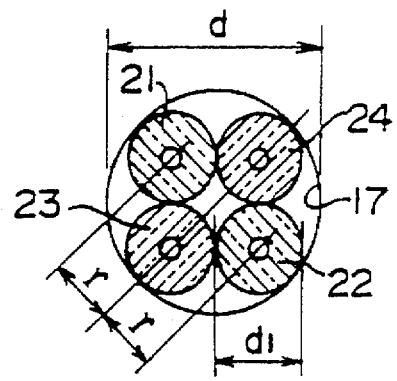
FIG. 2 is an enlarged view showing the relation between a terminal end hole of the optical fiber ferrule and the respective ends of the optical fibers.

FIG. 1 is a sectional view of a first embodiment of an optical fiber ferrule according to the present invention; and FIG. 2 is an enlarged view showing the relation between a terminal end hole of the optical fiber ferrule and the ends of uncovered optical fibers.

A through hole 17 having an inner diameter d=303 μm and a hole 19 for the insertion of optical fiber coverings 18 are provided at a center portion of a ferrule 16. The through hole 17 and the stepped hole 19 are connected to each other through a tapered surface 20 having an angle of inclination of 15° or less.

Denoted by numerals 21, 22, 23 and 24 are four optical fibers each having an outer diameter $d_1=125$ µm with the optical fiber coverings 18 being removed.

The relation between diameter d of the center through hole 17 of the 4-core ferrule 16 and the diameter of each uncovered optical fiber satisfies the following equation:

$$d=(2^{1/2}+1)d_1+\delta$$

where $d_1$ is the diameter of each uncovered optical fiber and δ represents an error.

By setting diameter d of the through hole in this manner, the uncovered optical fibers 21, 22, 23 and 24 may be smoothly inserted therein as shown in the end view of FIG. 2 such that they tightly adjoin one another at their outer diametrical surfaces and at the same time are in contact with the inner diametrical surface of the through hole 17.

Thereafter, they are bonded by means of an adhesive and an end surface 25 is polished into a surface incline of 8° to 12° with respect to a plane perpendicular to the optical axis. In this manner, at least two 4-core optical fiber incorporated ferrules $F_1$ and $F_2$ are made.

If the inner diameter of through 17 hole d=303 µm and the outer diameter of the uncovered optical fibers $d_1=125$ µm as described above, the positions of optical axis r of the respective uncovered optical fibers 21, 22, 23 and 24 with respect to the center axis are calculated to be 88.39–89.00 µm. The error in radius position with respect to each other becomes a very small value of 0.3 µm and may be ignored. Similarly, an error in the angular phase in the circumferential direction is 2.2 µm which is not a problem in practice.

Further, since the 4-core ferrule 16 has a relatively wide single center through hole 17, the two end faces of the through hole may be held at the center of a lathe to be used as the processing reference in polishing the outer diameter. It is thus possible to achieve precision in processing where both the precision in the outer diameter and the eccentricity of the through hole with respect to the outer diameter may be respectively controlled to 1 µm or less. It is preferable that the outer diametrical precision of the distributed refractive index rod lens be previously processed and corrected to be within ±1 µm.

An embodiment of the optical coupler according to the present invention using the above described optical fiber ferrule will now be described with reference to FIGS. 3 to 7.

Figure 3:
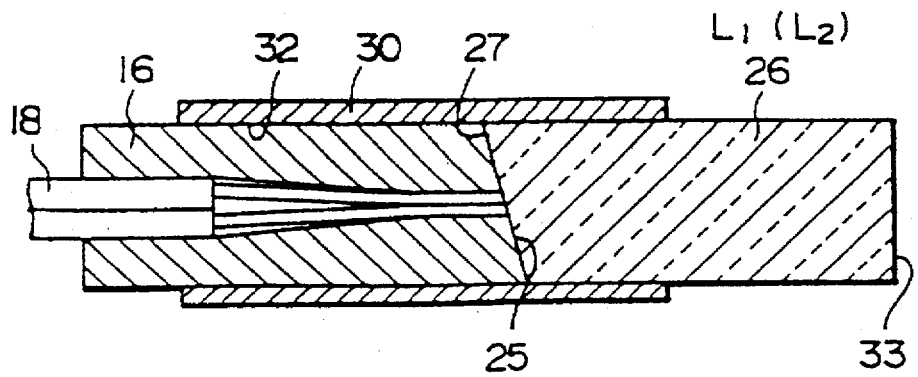
FIG. 3 is a sectional view showing the state of connecting the above optical fiber ferrule and a distributed refractive index rod lens.

FIG. 3 is a sectional view showing the state in which the above described optical fiber ferrule and a distributed refractive index rod lens are connected to each other. The distributed refractive index lens 26 is a convergent lens unit having the axial length of the rod lens of 0.25 pitch. One end surface 27 of the distributed refractive index rod lens 26 is polished to have the same angle of inclination of 8° to 12° with respect to a plane perpendicular to its optical axis to correspond to the angle of the terminal end of the above described ferrule.

The inclined surface 27 of the distributed refractive index rod lens 26 is brought into close contact with the inclined end surface 25 of the above described 4-core optical fiber ferrule $F_1$. It is inserted into and bonded to a through hole 32 of a first alignment sleeve 30 having a short axial length capable of inserting about one half of the axial length of the distributed refractive index rod lens 26. An integrally assembled, lens-incorporated ferrule assembly $L_1$ is then formed. A lens-incorporated ferrule assembly $L_2$ is similarly formed.

Figure 4:
FIG. 4 is a sectional view showing an embodiment of a second alignment sleeve which forms a part of the holding means of an embodiment of an optical coupler according to the present invention.

FIG. 4 is a sectional view showing an embodiment of a second alignment sleeve 31 which constitutes a part of the holding means of an embodiment of the optical coupler according to the present invention. As will be described later, the second alignment sleeve 31 is a sleeve for receiving the two distributed refractive index rod lenses 26 and 26' to bring them into alignment by causing a coincidence of their optical axes.

Figure 5:
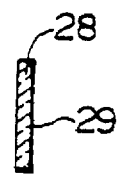
FIG. 5 is a sectional view of a mirror coating and a glass plate for supporting the mirror coating to be used in an embodiment of the optical coupler according to the present invention.

FIG. 5 is a sectional view of a mirror coating 29 and a glass plate 28 for supporting the coating for use in the first embodiment of the optical coupler according to the present invention. As shown in FIG. 5, a mirror coating 29 imparted with reflectance and transmittance that are different according to the wavelength is applied to one face of a thin plate glass 28.

Figure 6:
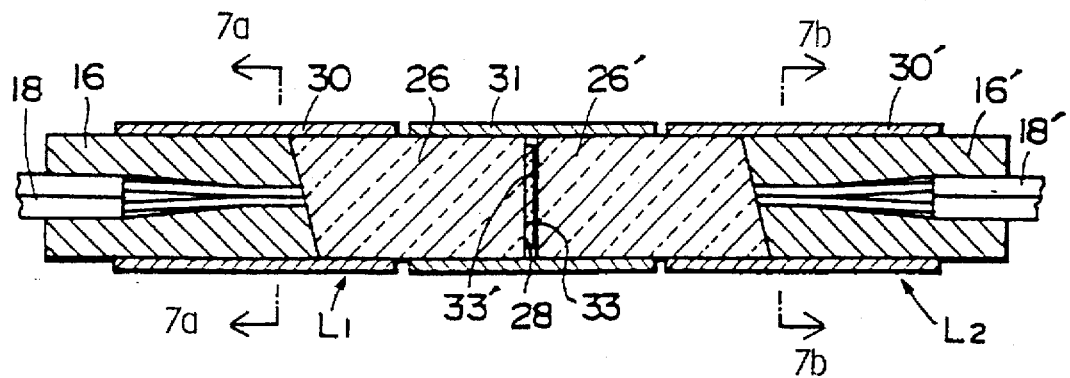
FIG. 6 schematically shows the first embodiment of an optical coupler according to the present invention.

As shown in FIG. 6, the first optical coupler according to the present invention is assembled such that a pair of optical elements shown in FIG. 3 sandwiches the thin plate glass 28 supporting the mirror coating 29 shown in FIG. 5 by using the second alignment sleeve 31 shown in FIG. 4.

The first alignment sleeves 30 and 30' are the alignment sleeves for receiving the 4-core optical fiber incorporated ferrules $F_1$ and $F_2$ and the distributed refractive index rod lenses 26 and 26', respectively, to align their optical axes.

In other words, in the state where the glass plate 28 is placed between the perpendicular end surfaces 33 and 33' of the distributed refractive index rod lenses 26 and 26' of the lens-incorporated ferrule assemblies $L_1$ and $L_2$, the insertion into the second alignment sleeve 31 is made such that the respective end surfaces are in close contact with one another.

Thereafter, the lens-incorporated ferrule assembly $L_2$ is rotated for adjustment to cause the optical axes of the optical fibers thereof to coincide with the symmetrical positions of the optical fibers of the lens-incorporated ferrule assembly $L_1$. The distributed refractive index rod lenses 26 and 26' are then fixed by means of adhesion to the through hole of the second alignment sleeve 31.

The operation of the embodiment shown in FIG. 6 will now be described with reference to FIGS. 7a and 7b.

Figure 7A:
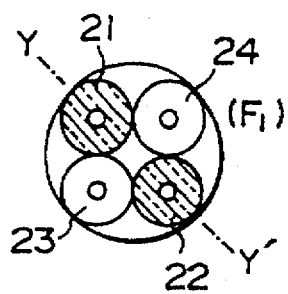
FIGS. 7a and 7b illustrate the relation between the opposing optical fibers in the embodiment of FIG. 6.
Figure 7B:
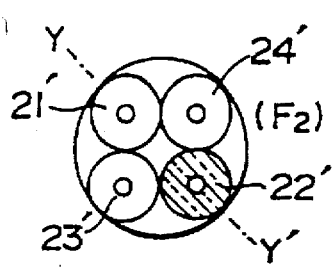

FIGS. 7a and 7b illustrate the relation between the opposing optical fibers in the above described embodiment. The reflectance and transmittance of the mirror plate 28 with respect to wavelengths $\lambda_1$ and $\lambda_2$ are selected such that $\lambda_1$ is reflected while $\lambda_2$ is transmitted.

Rays of wavelengths $\lambda_1$ and $\lambda_2$ having passed through the optical fiber 21 may be demultiplexed and guided to the optical fibers 22' and 22, respectively. Conversely, by reversing the direction of a light beam, a ray of wavelength $\lambda_1$ in the optical fiber 22' and a ray of wavelength $\lambda_2$ in the optical fiber 22 may be multiplexed into the optical fiber 21. That is, a 1×2 circuit optical wave demultiplexer/multiplexer may be constructed. The optical fibers 23, 24, 21', 23', 24' are not used and these function as dummies for the alignment of the optical fibers 21, 22, and 22'.

Further, rays of wavelengths $\lambda_1$ and $\lambda_2$ having passed through the optical fiber 23 may be demultiplexed and guided to the optical fibers 24' and 24, respectively. In this case, a pair of 1×2 circuit optical wave demultiplexers/multiplexers may be constructed.

The optical fibers to be used as "dummies" in achieving alignment may be cut off at the rear end portion of the ferrule after its assembly.

Figure 8:
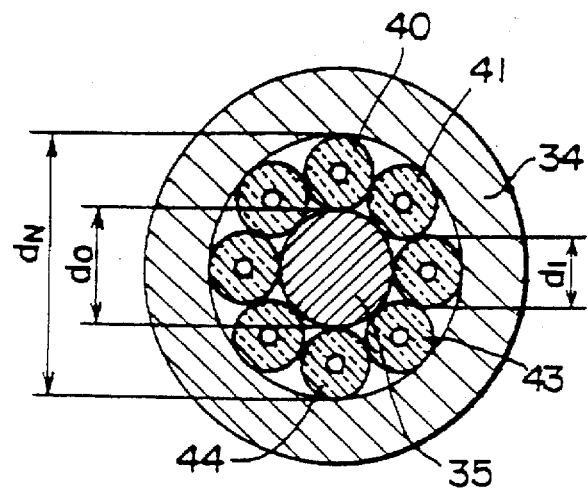
FIG. 8 is a sectional view of a second embodiment of optical fiber ferrule according to the present invention.
Figure 9:
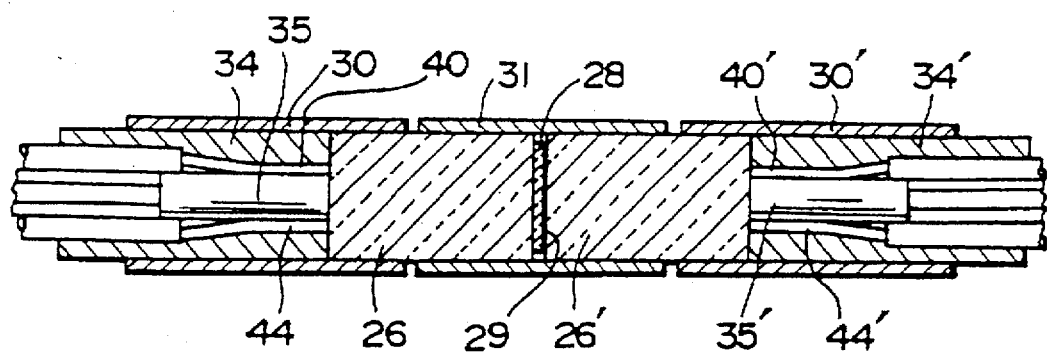
FIG. 9 is a sectional view showing an embodiment of an optical coupler using the optical fiber ferrule as shown in FIG. 8.
Figure 10:
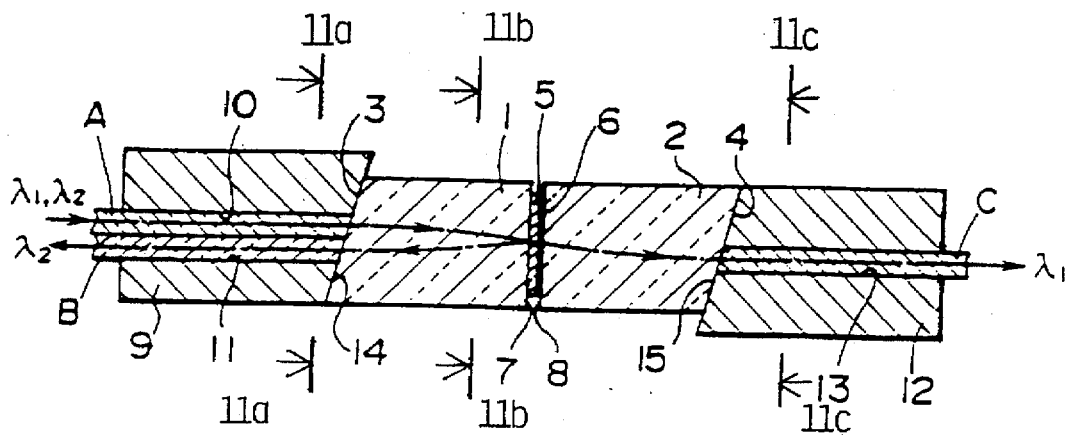
FIG. 10 is a longitudinal sectional view of a conventional optical coupler.
Figures 11A, 11B, 11C:
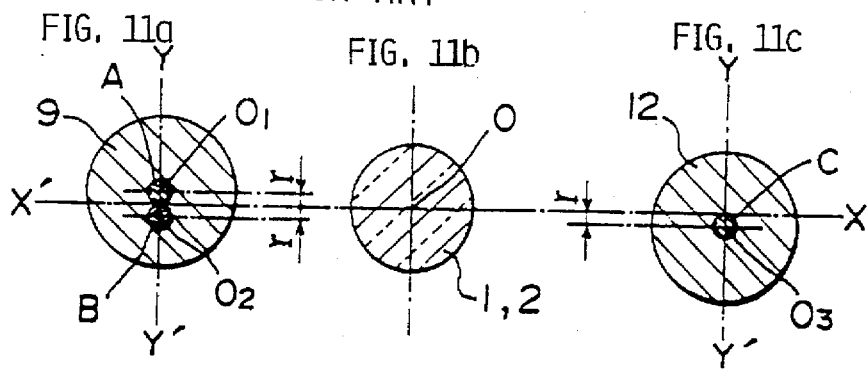
FIGS. 11a, 11b and 11c show respectively along a plurality of planes that are perpendicular to the optical axis of the conventional optical coupler as shown in FIG. 10.

A second embodiment of the optical fiber ferrule according to the present invention will now be described with reference to FIG. 8. FIG. 8 is an enlarged sectional view of a terminal end portion of the optical fiber ferrule. FIG. 9 is a sectional view showing an embodiment of the optical coupler using the optical fiber ferrule as shown in FIG. 8. Those portions having similar functions as in the embodiment of the optical coupler shown in FIG. 6 are denoted by the same reference numerals.

FIG. 8 is a sectional view of a N-core ferrule which may be a constituent part of N/2 (N=8) sets of 1×2 circuit optical couplers.

In general, N (an even number of 6 or larger) uncovered optical fibers, each having a diameter $d_1$, are disposed within a terminal end inner diameter $d_N$ of the N-core ferrule 34 with the optical fiber cores being in a concentric circle. An auxiliary rod 35 is then inserted into the center portion of the ferrule and is tightly secured therein. At this time, the inner diameter of the ferrule terminal end $d_N$, the diameter of an uncovered optical fiber $d_1$ and the outer diameter of the auxiliary rod $d_O$ are set to hold the following relationship:

$$d_N = d_1[(1/\sin\pi/N)+1]+\delta \quad (1)$$

$$d_O = d_1[(1/\sin\pi/N)-1] \quad (2)$$

In equation (1), δ represents an error.

When N=6, the outer diameter of the auxiliary rod $d_O$ is equal to $d_1$. In such case, an uncovered optical fiber may be used as the auxiliary rod.

FIG. 9 is a sectional view showing an embodiment of the optical coupler using the optical fiber ferrule shown in FIG. 8. In this figure, first alignment sleeves 30 and 30' have a similar function as the above described first alignment sleeve and serve to dispose the distributed refractive index rod lenses 26 and 26' at the terminal ends of ferrules 34 and 34'.

A mirror coating 29 is provided on a glass plate 28 and the glass plate 28 is supported between the distributed refractive index rod lenses 26 and 26' by means of a second alignment sleeve 31.

The ferrules 34 and 34' and the distributed refractive index rod lenses 26 and 26' are inserted into the first alignment sleeves 30 and 30' with an accurate correspondence of their optical axes to make a pair of lens-incorporated ferrules. The portions of the distributed refractive index rod lenses 26 and 26' extending from the first alignment sleeves 30 and 30' of the lens-incorporated ferrules may be inserted into the through hole of the second alignment sleeve 31 to achieve an accurate coincidence of the optical axes of all the components. One of the lens-incorporated ferrules is rotated to adjust the angle in the circumferential direction.

It is supposed here that the mirror coating 29 of the glass plate 28 reflects an optical wavelength component $\lambda_1$ and transmits an optical wavelength component $\lambda_2$. From a light beam consisting of wavelengths $\lambda_1$ and $\lambda_2$ having passed through the optical fiber 40, rays of wavelength $\lambda_1$ are separated and guided to the optical fiber 44 and rays of $\lambda_2$ are separated and guided to the optical fiber 44'. By connecting a ray of wavelength $\lambda_1$ to optical fiber 44 and a ray of wavelength $\lambda_2$ to optical fiber 44', they are multiplexed into the optical fiber 40. In other words, 8/2=4 circuits of 1×2-circuit optical wave demultiplexers/multiplexers may be constructed with this embodiment. In general, N/2 circuits of optical wave demultiplexers/multiplexers may be constructed by using an optical fiber ferrule having N cores.

The outer diameter of each ferrule of the optical coupler according to the present invention may be precisely processed by using its center hole as a reference. It may be processed to precisely correspond to the outer diameter of a distributed refractive index rod lens. Both an alignment of the optical axes and the angular adjustment are easy. The ability required in its assembly and operation is equivalent to that for an ordinary optical connector assembly so that a skill such as the one in the conventional example is not necessary and a great reduction in man-hours for assembly is possible. Further, with the second optical coupler, it is possible to integrally incorporate N/2 sets of 1×2 circuit optical wave demultiplexers/multiplexers or light branching/coupling devices so that the size and weight of the system may be reduced to result in a great economical advantage.

What is claimed is:

1. An optical coupler, comprising:

first and second optical fiber ferrules, each of said ferrules having a body with an outer diameter and a terminal end, an axis, a through hole at the terminal end parallel to the axis, four optical fibers with an uncovered portion at one end inserted into and fixed in the terminal end of said ferrule whereby the ends of the uncovered portions of the four optical fibers closely adjoin one another and are exposed, the terminal end being polished into a surface inclined by an angle ⊖ with respect to a plane perpendicular to the axis of the ferrule;

first and second distributed refractive index rod lenses, each of said distributed refractive index rod lenses having an optical axis, a cylindrical surface with an outer diameter, and one end surface polished to have an inclination ⊖ with respect to the optical axis;

a mirror coating layer reflecting a portion of and transmitting another portion of a light beam incident thereon; and a holding means for bringing the inclined surfaces of said first ferrule and said first distributed refractive index rod lens into close contact, bringing the inclined surfaces of said second ferrule and said second distributed refractive index rod lens into close contact, disposing said mirror coating layer between said first and second distributed refractive index rod lenses, and coaxially holding the first and second optical fiber ferrules, the first and second distributed refractive index rod lenses and the mirror coating layer.

2. An optical coupler according to claim 1 wherein the outer diameters of the cylindrical bodies of said first and second ferrules and the outer diameters of the cylindrical surfaces of said first and second distributed refractive index rod lenses are substantially the same and said holding means is provided as a circular cylinder having an inner diameter corresponding to the outer diameters of the cylindrical bodies of said first and second ferrules and the outer surfaces of said first and second distributed refractive index rod lenses.

3. An optical fiber ferrule, comprising a cylindrical body with a terminal end and an inner circumferential surface having an inner diameter, N (an even number of 6 or larger) uncovered optical fibers fixed in close contact with the inner circumferential surface at the terminal end of said ferrule, each of the uncovered optical fibers having a diameter, and an auxiliary rod having an outer diameter inserted into the center of the optical fibers to position the optical fibers in a concentric circle, wherein the following relations hold among the inner diameter of the inner circumferential surface at the terminal end of said ferrule, the diameter of each of the uncovered optical fibers and the outer diameter of the auxiliary rod:

$$d_N = d_1[(1/\sin \pi/N)+1]+\delta$$

$$d_O = d_1[(1/\sin \pi/N)-1]$$

where $d_N$ is the inner diameter of the inner circumferential surface of said ferrule, $d_1$ is the diameter of each uncovered optical fiber, $d_O$ is the outer diameter of the auxiliary rod; and $\delta$ represents an error.

4. An optical coupler, comprising:

first and second optical fiber ferrules as claimed in claim 3;

first and second distributed refractive index rod lenses;

a mirror coating layer reflecting a portion of and transmitting another portion of a light beam incident thereon; and a holding means for bringing said first ferrule and said first distributed refractive index rod lens into close contact, bringing said second ferrule and said second distributed refractive index rod lens into close contact, disposing said mirror coating layer between said first and second distributed refractive index rod lenses, and coaxially holding the first and second optical fiber ferrules, the first and second distributed refractive index rod lenses, and the mirror coating layer.

5. An optical fiber ferrule, comprising:

a cylindrical body having an axis, a terminal end polished into a surface inclined by an angle $\ominus$ with respect to a plane perpendicular to the axis, and a through hole at the terminal end parallel to the axis, said through hole having an inner diameter at the terminal end; and four optical fibers, each of the optical fibers having an uncovered portion at one end with an outer diameter and each of the optical fibers being inserted into and fixed in the through hole at the terminal end of said optical fiber ferrule whereby the uncovered portions of the optical fibers closely adjoin one another and the ends of the uncovered portions are exposed;

wherein the angle of inclination $\ominus$ is 8° to 12° and the following relation holds between the inner diameter of the through hole of said ferrule and the outer diameter of the uncovered portion of the optical fiber:

$$d = (2\tfrac{1}{2}+1)d_1 + \delta$$

where $d$ is the inner diameter of the through hole of said ferrule, $d_1$ is the outer diameter of each uncovered portion of the optical fiber and $\delta$ represents an error.

* * * * *